United States Patent [19]

Cowell et al.

[11] Patent Number: 4,508,178
[45] Date of Patent: Apr. 2, 1985

[54] TRACTOR LINKAGE WITH PITCH ALTITUDE CONTROL CONNECTED TO SENSOR RAM

[76] Inventors: Peter A. Cowell, 41 Chalfont Rd., Oxford; Paul F. Herbert, 12 Anderson Ave., Rugby, Warwickshire CV22 5PE, both of England

[21] Appl. No.: 424,302

[22] Filed: Sep. 27, 1982

[30] Foreign Application Priority Data

Sep. 28, 1981 [GB] United Kingdom ............... 8129222

[51] Int. Cl.³ .................................... A01B 63/111
[52] U.S. Cl. ................................. 172/239; 172/7
[58] Field of Search ............. 172/7, 9, 10, 239, 444, 172/445, 605, 2, 439; 280/405 B, 406 R, 446 A

[56] References Cited

U.S. PATENT DOCUMENTS

| | | | |
|---|---|---|---|
| 2,755,721 | 7/1956 | Rusconi | 172/4 |
| 2,832,276 | 4/1958 | Heitshu | 172/9 |
| 2,887,165 | 5/1959 | Heitshu et al. | 172/9 |
| 2,887,166 | 5/1959 | Vogelaar | 172/9 |
| 2,887,167 | 5/1959 | Heitshu et al. | 172/9 |
| 3,517,943 | 6/1970 | Bunting et al. | 280/405 B |
| 3,583,494 | 6/1971 | Thompson et al. | 280/406 R X |
| 3,670,822 | 6/1972 | Reinhardt | 172/7 |
| 4,393,942 | 7/1983 | Mijot et al. | 172/2 |

FOREIGN PATENT DOCUMENTS

| | | |
|---|---|---|
| 1076987 | 3/1960 | Fed. Rep. of Germany . |
| 916366 | 12/1946 | France . |
| 937993 | 9/1963 | United Kingdom . |
| 952170 | 3/1964 | United Kingdom . |
| 959986 | 6/1964 | United Kingdom . |
| 1018786 | 2/1966 | United Kingdom . |
| 1293998 | 10/1972 | United Kingdom . |

Primary Examiner—Richard T. Stouffer
Attorney, Agent, or Firm—Cushman, Darby and Cushman

[57] ABSTRACT

A plow beam 4 is coupled to a tractor chassis 1 by a three-point linkage having a top link 9 and two bottom links 3. The top link 9 is a double acting control ram 23 which has hydraulic couplings 26,28,25 and 27 which cross-couple the control ram 23 to a double acting sensor ram 21 so that expansion of one ram produces contraction of the other. The sensor ram 21 is coupled between a pivot 17 at the head of the lift rod 18 of a conventional lift mechanism for the plow, and a pivot 22 on the tractor chassis. Movement of the lift rod 18 due to height variation of the plow beam 4 actuates the sensor ram 21 to vary the length of the top link 9, so as to vary the pitch attitude of the plow. Good land profile following is achieved by a high rate of change of pitch at normal working depth. A lower rate of change is achieved as the plow is raised out of work.

8 Claims, 14 Drawing Figures

FIG. 2a. SURFACE AND REAR FURROW PROFILE

FIG. 2b. REAR FURROW DEPTH

FIG. 2c. SURFACE AND REAR FURROW PROFILE

FIG. 2d. REAR FURROW DEPTH

TRACTOR LINKAGE WITH PITCH ALTITUDE CONTROL CONNECTED TO SENSOR RAM

The present invention relates to linkages for tractors and is concerned in particular, but not exclusively, with such linkages when used for coupling an agricultural plough to the rear of a tractor. The invention is applicable however to other soil-engaging implements such as, for example, disc implements, cultivators, harrows, ridgers, mole ploughs and trench diggers.

Such implements are normally coupled behind a tractor by a linkage which includes a pivotal framework in the form of a three point hitch which allows the implement to move up and down relative to the tractor.

When using a soil-engaging implement it is normally a requirement to maintain the implement as far as possible at a constant working depth irrespective of ground surface undulations.

On some forms of tractor no control system is provided to regulate the vertical position of the implement whilst it is in work and the three point hitch is simply allowed to rise and fall relative to the tractor under the action of gravity and the forces applied to the implement by the soil.

A common form of control system used to regulate implement working depth is the so-called "draft control" system in which the vertical position of the implement relative to the tractor is controlled by a hydraulic lift ram so as to maintain, as far as possible, a constant draft force on the implement. Draft control systems provide a reasonably successful approximation to a true depth control in most conditions and operate on the approximation that a constant draft force on the implement corresponds to a constant working depth.

No matter what form of control system is used to regulate the vertical position of the implement it has been found that the known linkages place geometrical constraints on the attitude of the implement such that unacceptable variations in working depth occur when working over field undulations. Other factors (such as tractive capacity and linkage stability) dictate to a large extent the linkage configuration. Such known linkages tend not to take adequate account of variations of the pitch attitude of the tractor as it passes over undulations in the ground and the implement working depth is not always maintained constant. It is found that the geometry of the pivotal framework of the linkage, insofar as it uses pivotted elements of fixed lengths, imposes limitations upon the extent to which not only the vertical position of the implement frame above the ground surface, but also its attitude in relation to the ground surface, can be kept constant during changes in attitude of the towing vehicle. If the attitude of the implement frame in relation to the ground surface is not kept substantially constant while the attitude of the towing vehicle changes, the implement tends to dig into the ground or to ride up out of the ground.

Furthermore, these problems increase as the speed of forward movement of the implement is increased. Similarly, if the length of the implement frame, for example a plough beam, is increased the problems associated with the control of the working depth of the implement are also increased. The problem is also more acute as the required working depth of the implement decreases, since the sensitivity of the system to variations of, for example, draft force is not necessarily adequate. There are, for example, at the present time requirements for ploughing speeds to be increased, for plough frames of greater length to be employed, and for ploughing to be carried out at shallower depths, and the present invention is directed to the solution of these problems in a more satisfactory manner.

There has been proposed previously an attempt to mitigate the problems set out above by providing a variable length top link in a three point hitch by which an agricultural plough is towed behind a tractor. The purpose of the top link variation has been to enable the plough to follow more closely undulations in ground surface and to maintain a more constant ploughing depth.

In one prior proposal two depth sensing wheels were used, one at the front of the implement to control the lower link position through the lift ram, and one at the rear of the implement to control the length of a hydraulic ram replacing the top link.

Two further systems have been proposed by Hesse and Möller for controlling the length of a hydraulic ram replacing the top link. One system sensed the force in the top link to give an indication of tractor pitch attitude and adjusted the length of the top link to keep this force at a present level. The other system sensed the vertical load between the tractor front axle and the chassis and adjusted the length of the top link to keep this force at a present level.

None of the above prior proposals has yet found acceptance in practical circumstances.

The geometry of a conventional three point hitch is such that the pitch attitude of the implement is varied as the implement is raised and lowered between its working and transport positions. It is also known to be possible (see, for example, the David Brown 900 Series tractors circa 1959) to increase this variation by connecting the top link to a crank arm which rotates with a rockshaft of the linkage so as to shorten the effective length of the top link when in the transport position to give increased clearance under the rear end of an implement.

It is an object of the present invention to provide an improved tractor linkage which permits better implement ground profile following.

According to the present invention there is provided a tractor linkage for coupling a soil engaging implement to a tractor, the tractor linkage comprising a pivotal framework for coupling the implement to the tractor, sensing means for providing a control signal indicative of the pivot angle of the framework relative to the reference plane on the tractor, and control means for varying the pitch attitude of the soil engaging implement whilst in work in response to said control signal.

Variation of pitch attitude of the implement may be achieved by variation of the geometry of the pivotal framework.

This variation in geometry may be achieved by variation in the spatial relationship between the pivot axes of the framework during changes in the pivot angle of the framework.

The invention has particular application where the said pivotal framework is generally in the form of a conventional three point hitch comprising one top link and two bottom links and the implement is towed behind the tractor.

The said variation of geometry may be achieved by varying the lengths of the two bottom links in unison, or by varying the lengths of all three links, but it is preferred that the variation of geometry is achieved by varying only the length of the top link, in response to said control signal.

Preferably the control means comprises hydraulic control ram means for varying the length of the top and/or bottom links.

Preferably the control means is passive in that the force used to vary the pitch attitude of the implement is derived from forces exerted between the implement and the tractor.

Preferably the sensing means comprises hydraulic sensor ram means which provides a displacement of fluid in response to changes in the pivot angle of the framework relative to the tractor, said displacement of fluid being communicated to the hydraulic control ram means to effect said variation in the length of the top link and/or bottom links.

Preferably the control ram means and the sensor ram means are both double acting rams, having their corresponding cylinder cavities cross-linked so that displacement of fluid into one cavity and out of the other cavity of the sensor ram means results in displacement of fluid out of and into the corresponding cylinder cavities of the control ram means, such that extension of the hydraulic sensor ram means is accompanied by contraction of the hydraulic control ram means and contraction of the hydraulic sensor ram means is accompanied by extension of the hydraulic control ram means.

During normal operation, when the implement is in work, the arrangement is such that upward pivoting of the framework results in shortening of the top link.

Adjustment means are preferably provided for adjusting the relative lengths of the control and sensor ram means to set up the initial working position of the implement.

The adjustment means may comprise adjustment valve means for controlling the supply of fluid to and from the cavities of the control ram means to adjust the length of the top link and/or bottom links to give the required initial working position of the implement.

Isolating valve means may be provided for isolating the control ram means from the sensor means to allow the pivotal framework to be lifted without adjustment of the length of any of the framework links.

In a preferred arrangement the isolating valve means is operated automatically when the pivotal framework is pivoted above a predetermined position.

In an alternative form of a linkage according to the invention, the variation in length of the top link and/or both bottom links is effected by hydraulic ram means supplied with hydraulic pressure from an external source in response to said control signal.

In the invention in this form the cam means may be connected with the pivotal framework for movement in response to pivotal movement of the framework, said control signal being derived from movement of the cam means.

In a preferred arrangement of this sort, the cam means may operate a sensor, said sensor being connected to control an electro-hydraulic control valve controlling the supply of hydraulic fluid to the hydraulic ram by which variation of the length of the top link is carried out. Preferably the hydraulic ram controlling the variation of length of the top link is a double acting ram and the electro hydraulic valve controls the flow of fluid to one and from the other of the two cylinder cavities thereof.

The invention also provides a linkage for use with an implement comprising a first portion coupled with the framework and a second portion which carries the soil engaging elements of the implement and is pivotable relative to the first portion, the control means being arranged to vary the pitch attitude of the implement by pivoting the second portion of the implement relative to the first portion.

The invention further provides a tractor linkage for coupling a soil-engaging implement to a tractor, the tractor linkage including a three point hitch comprising one top link and two bottom links, first ram means included in the top link and/or both bottom links so that changes in the length of the first ram means also constitute changes in length of the top link and/or both bottom links, and second ram means arranged to change in length with changes in the pivot angle of the bottom links, the first and second ram means being hydraulically interconnected so that extension of one ram means is accompanied by contraction of other ram means.

Embodiments of the invention will now be described by way of example with reference to the accompanying drawings in which.

Figure 1:
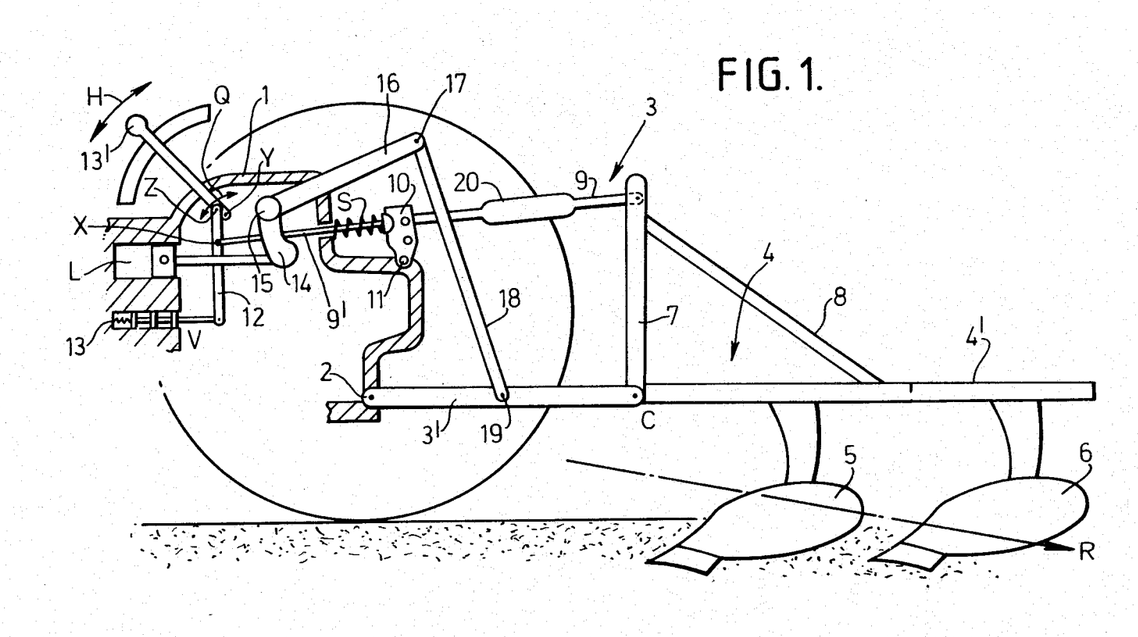
FIG. 1 is a diagrammatic side view of a known three point hitch for coupling a mouldboard plough to the rear of a tractor, including a hydraulic lift assembly with a conventional draft control system.

In FIG. 1 the rear end of a tractor chassis is shown at 1 as a cross hatched section. Pivoted at main pivots 2 and 11 on the chassis 1 is a pivotal framework indicated generally at 3 in the form of a three point hitch. The hitch has a top link 9 and two spaced bottom links one of which is shown at 3'. Pivoted on the rear ends of the links 3',9 is an implement 4.

In the example shown the implement is a mouldboard plough having a frame 4' (also referred to as the plough beam) which carries plough bodies 5 and 6 and a mast 7 which is supported at right angles to the beam by a brace 8.

The top link 9 is supported at the tractor end by a mounting lever 10 which is pivoted at pivot 11 to the tractor chassis. The top link 9 is urged towards the right in the drawing by a compression spring S which bears upon the mounting lever 10. A rod 9' extends from the lever 10 through the chassis wall within spring S and is pivoted at X on a so-called balance lever 12 the lower end of which controls a hydraulic valve V which is held against lever 12 by a spring 13.

The valve 13 controls the supply of pressurised hydraulic fluid to a lift ram L the stem of which is connected to a lever 14 which is mounted on a rock shaft 15. A pair of lift arms 16 are mounted on rock shaft 15, each lift arm being pivoted at its free end 17 to a lift rod 18 which extends downwardly and is pivoted at 19 to a point on the associated bottom link 3'.

At its upper end the balance lever 12 is pivoted at Z to a hand lever 13 which is itself pivotally mounted at Y. Pivoting of hand lever 13' (as indicated by arrow H) moves the pivot Z (as indicated by arrow Q) so that lever 12 pivots at X to open valve V to either raise links 3' by pressurising ram L or allow links 3' to pivot downwardly by partially venting ram L. Valve V remains open until the displacement applied to lever 12 via rod 9' (which is indicative of the draft force on the plough) is sufficient to return the valve to its neutral position when the implement has reached its equilibrium depth corresponding to the particular position of lever 13'.

The operation of this arrangement is as follows:

With the plough moving at its chosen working depth, i.e., the equilibrium depth set by lever 13', the valve V is in a neutral position and the force in the top link 9 is in equilibrium with the force in spring S. If now the front end of the tractor rides into a depression this will tend to raise the rear end of the tractor chassis and the plough frame 4 would tend to rise above the ground surface. However, as the plough tends to ride up out of the soil the draft force on it decreases and hence the force in top link 9 will decrease so that it will move towards the right as seen in the drawing under the action of the spring S. This moves the valve V in the appropriate sense to vent the ram L to allow the ram to move towards the left as seen in the drawing. This allows the lift arms 16 to rotate in a clockwise sense with the consequent lowering of bottom links 3' and plough beam 4'. The plough continues to be lowered until the top link force increases again sufficiently to cause the control valve to return to neutral.

When the tractor returns to the horizontal attitude the reverse process takes place and the increasing draft force on the top link 9 operates the valve V to extend the lift ram L to turn the lift arms 16 anti-clockwise and raise the beam 4'.

With this arrangement it will be seen that although the beam 4 is raised and lowered automatically to compensate for changes in the attitude of the tractor as it passes over undulations, the geometry of the main components of the pivotal linkage is substantially constant and the attitude of the implement, in this case a plough, towards the ground surface will therefore vary as the framework is raised or lowered. The attitude of the frame 4 can be arranged to be correct for the equilibrium working depth by varying the length of the top link 9 and this is usually done by providing a turnbuckle or other adjustment means in the top link 9 indicated diagrammatically at 20.

Figure 2A:
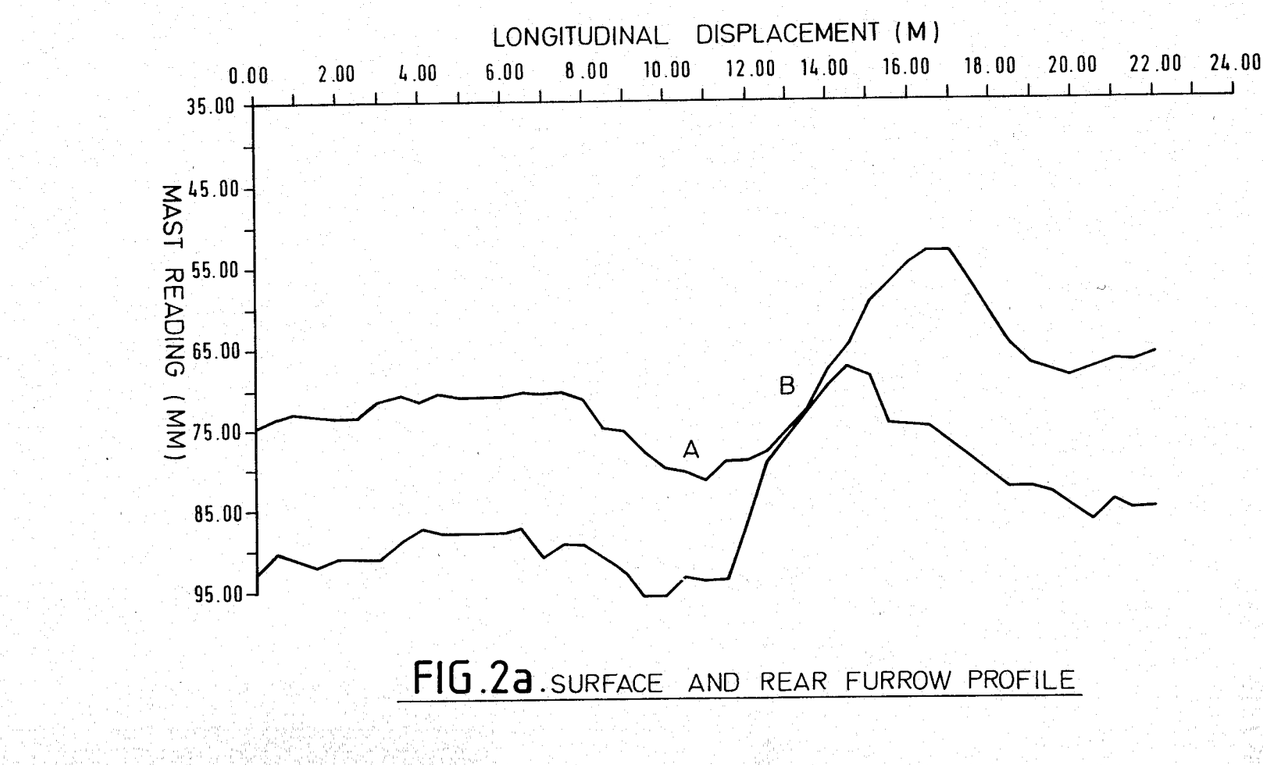
FIGS. 2a and 2b show diagrams illustrating the performance of a known form of linkage as shown in FIG. 1.
Figure 2B:
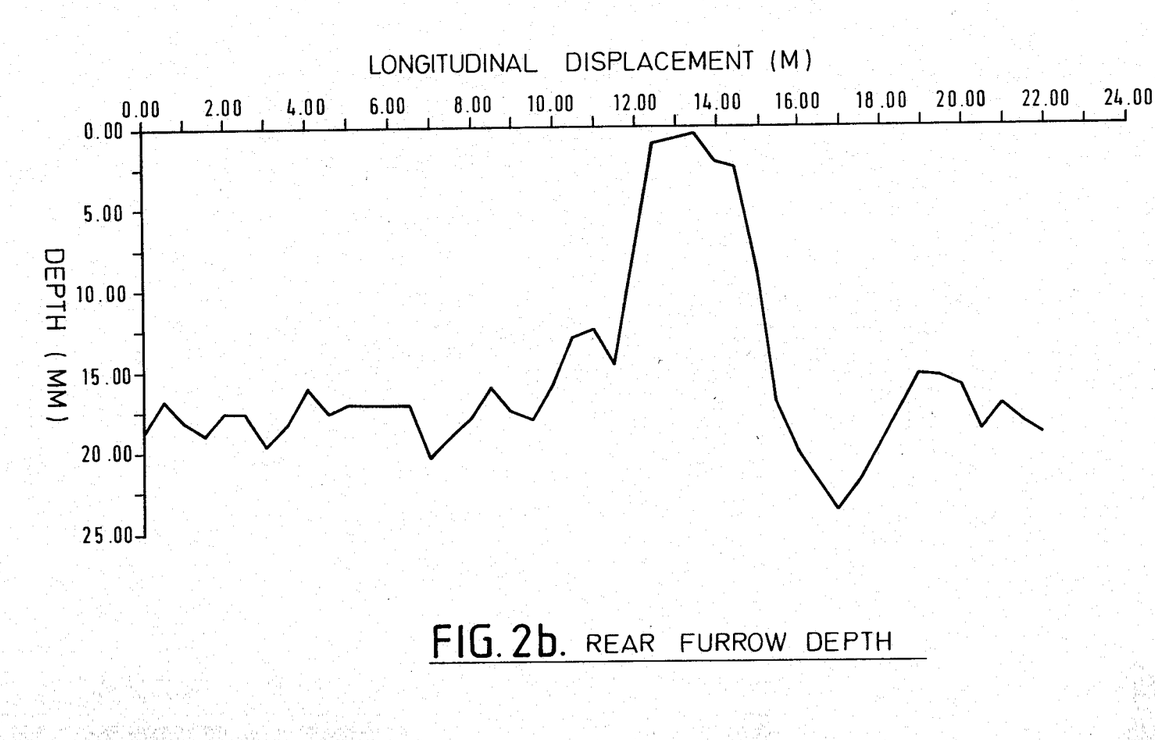

While the arrangement so far described provides a reasonable degree of profile following there are times when it cannot meet the requirements imposed by a substantial undulation in the ground. The behaviour in a typical situation is illustrated in FIGS. 2a and 2b. In FIG. 2a the upper trace shows the ground surface profile in which the vertical scale is greatly exaggerated and the lower trace shows the profile of the bottom of the furrow cut by the rear body of the plough. It will be seen that whereas the plough frame is raised and lowered in reasonable conformity with the ground profile up to the point A, beyond this point, which corresponds to a greater undulation in the soil surface, the plough does not penetrate sufficiently. FIG. 2b shows the resulting furrow depth and it will be seen that at point B the depth reduced virtually to zero; in other words the plough very nearly left the ground completely. Thereafter the correct furrow depth was restored and profile following continued in a satisfactory manner.

Figure 3A:
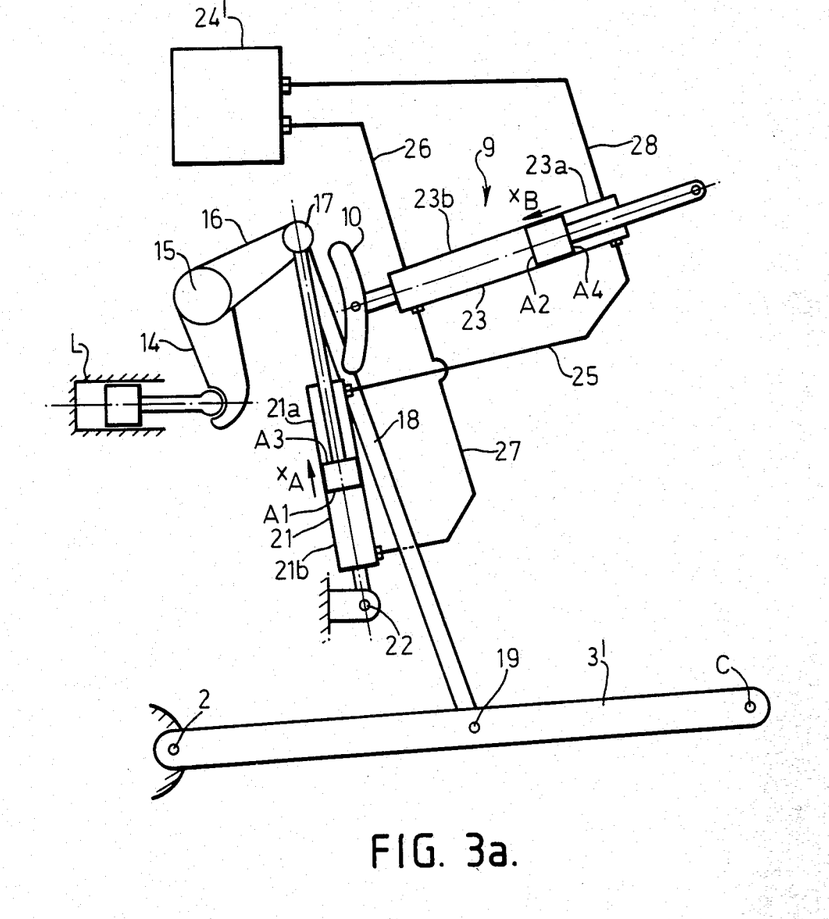
FIG. 3a is a diagrammatic representation in side view of a tractor linkage embodying the invention.

An arrangement according to the invention which provides improved profile following is illustrated diagrammatically in FIG. 3(a). In this figure parts corresponding to those of FIG. 1 have been correspondingly identified. In this arrangement however the top link 9 incorporates an hydraulic control ram 23. A further hydraulic sensor ram 21 has also been introduced, and is connected between the free end 17 of lift arm 16 and a point 22 on the tractor chassis. Thus, as the lift rod 18 is raised and lowered so the ram 21 will be contracted and expanded. Both the ram 21, and the ram 23 in the top link 9, are double acting rams and they are interconnected in the following manner. The cavity 21a behind the piston in ram 21 is connected through an hydraulic line 25 to cavity 23a behind the piston of ram 23. Cavity 21b of ram 21 is connected through a line 27 to the cavity 23b of ram 23. Thus if the lift rod 18 is lowered by the lift ram L and the lift arm 16, the ram 21 will be shortened and hydraulic fluid will be expelled from cavity 21b through line 27 to the cavity 23b of ram 23, thus lengthening top link 9. Clearly, if on the other hand lift rod 18 is raised by arm 16, ram 21 will be lengthened and hydraulic fluid will be expelled from cavity 21a through line 25 to the cavity 23b of ram 23 thus shortening top link 9.

As will be appreciated, in order to set up the initial working position of the plough, it will be necessary to adjust the length of top link 9. Provision for this adjustment can be made in a number of ways. For example, a turnbuckle could be built into the top link to allow the adjustment to be made mechanically.

Alternatively, the cavities 23a and 23b of ram 23 can be interconnected by an hydraulic line which includes a top. In such an arrangement when the top is open fluid can flow from one cavity to the other to enable the length of the top link to be adjusted.

FIG. 3a shows a preferred hydraulic adjustment arrangement in which cavities 23a and 23b of ram 23 are connected via lines 28 and 26 respectively with the spool valves 24' of an auxiliary hydraulic supply of the tractor. Thus, for example, if top link 9 requires increasing in length to set up the initial working position, fluid is supplied from the approximate spool valve to cavity 23b via line 26 and fluid is exhausted to an auxiliary sump from cavity 23a via line 28.

By the system so far described therefore, the raising and lowering of the implement frame by the lift assembly is accompanied by a shortening and lengthening of the top link so that not only will the implement frame be raised and lowered to follow the ground profile but at the same time the geometry of the system will be varied in such a manner as to maintain the implement frame more nearly in the correct attitude for the plough or other implement to follow the ground contour. The required change of attitude is that when the implement is raised the pitch attitude is made steeper, and when the implement is lowered, the pitch attitude is made less steep, during normal working. The effect thus is that a longer array of earth working implements can be towed by the tractor without loss of profile following since the implement is largely isolated from the pitch variations of the tractor. This is possible since, although the virtual hitch point locus is similar to that of known conventional linkages, the variation in length of the top link causes the rotational centre of the implement to be much closer to the rear of the tractor than the virtual hitch point.

Figure 3B:
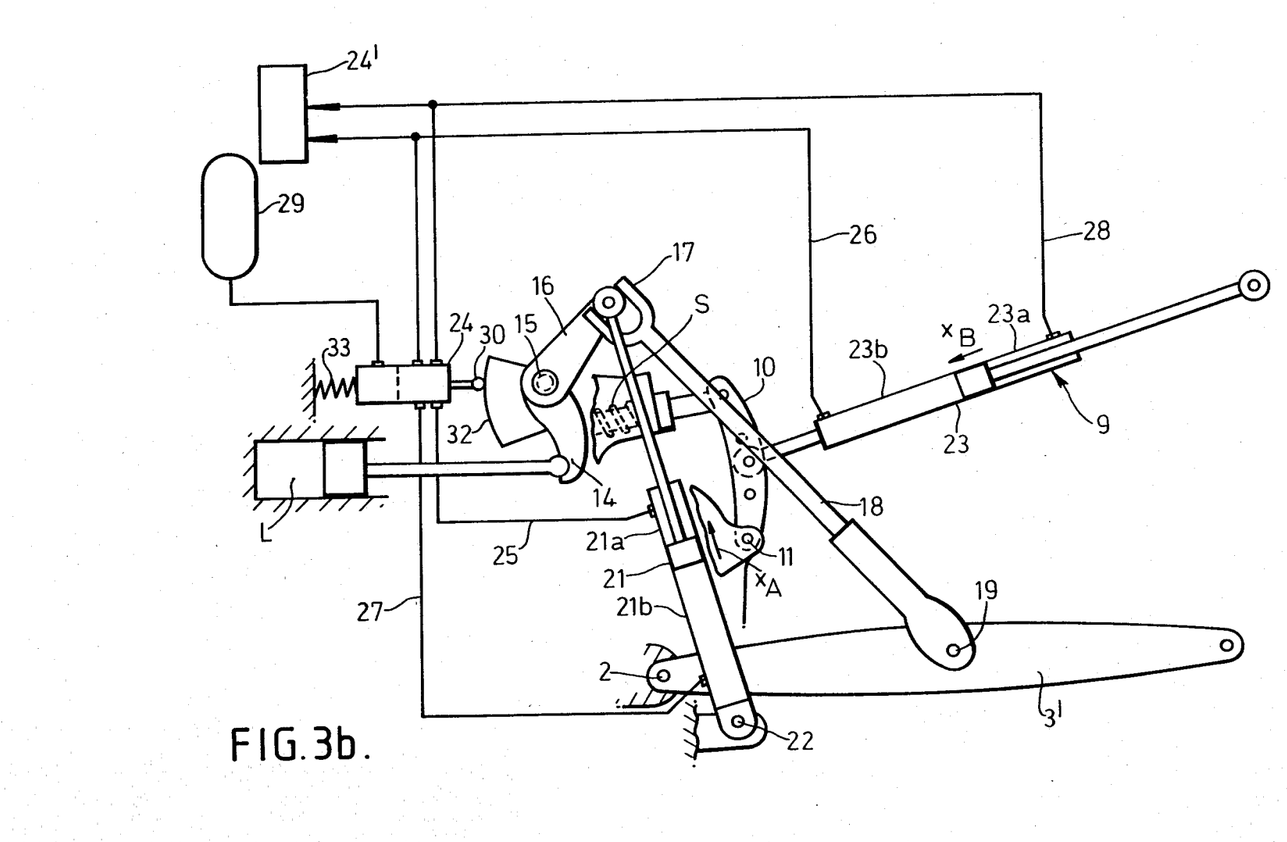
FIG. 3b is a diagrammatic representation of a more elaborate linkage embodying the invention.

In order for the linkage to operate correctly it is of course necessary to choose the dimensions carefully. If the piston areas of the two rams are designated $A_1$, $A_2$, $A_3$ and $A_4$ as indicated in the FIG. 3b, the relationship $$A_1/A_3 = A_2/A_4$$

must be maintained. It has moreover been established that the required rates of movement of the rams in the configuration illustrated in FIG. 3(a) should be as follows:

$$x_A/x_B = A_2/A_1$$

where $x_A$ equals the longitudinal movement of ram 21 and $x_B$ represents the longitudinal movement of ram 23.

Figure 2C:
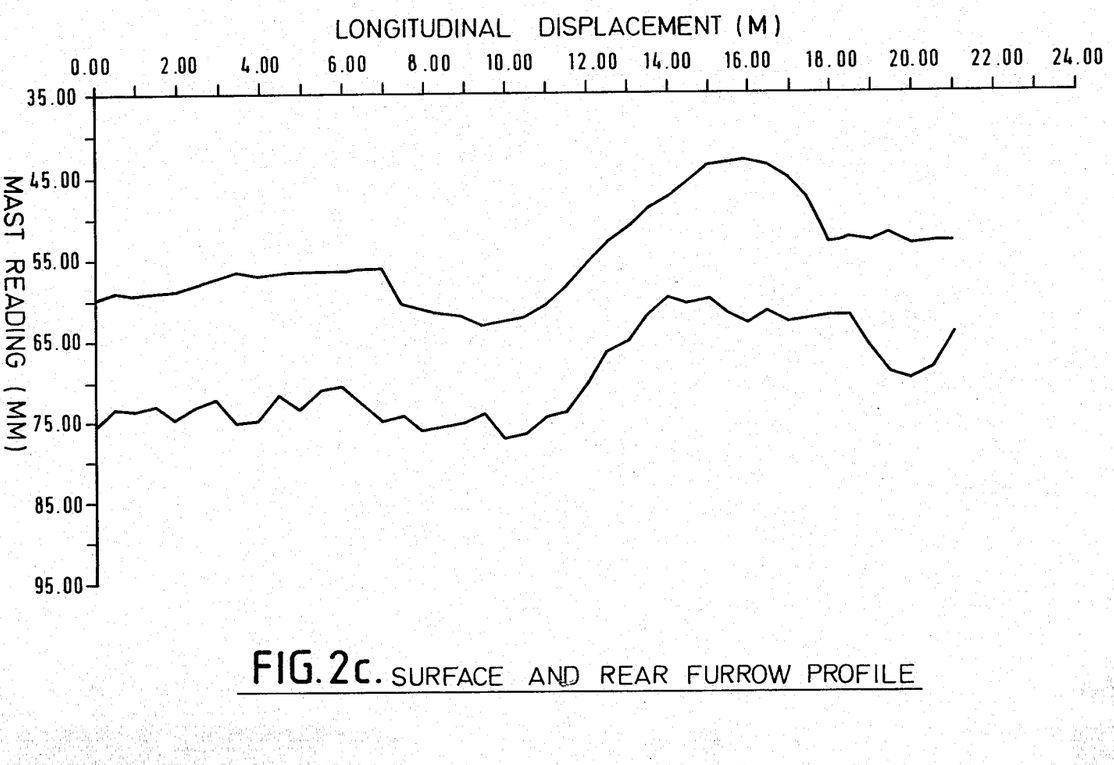
FIGS. 2c and 2d show diagrams illustrating the performance of a linkage embodying the invention.
Figure 2D:
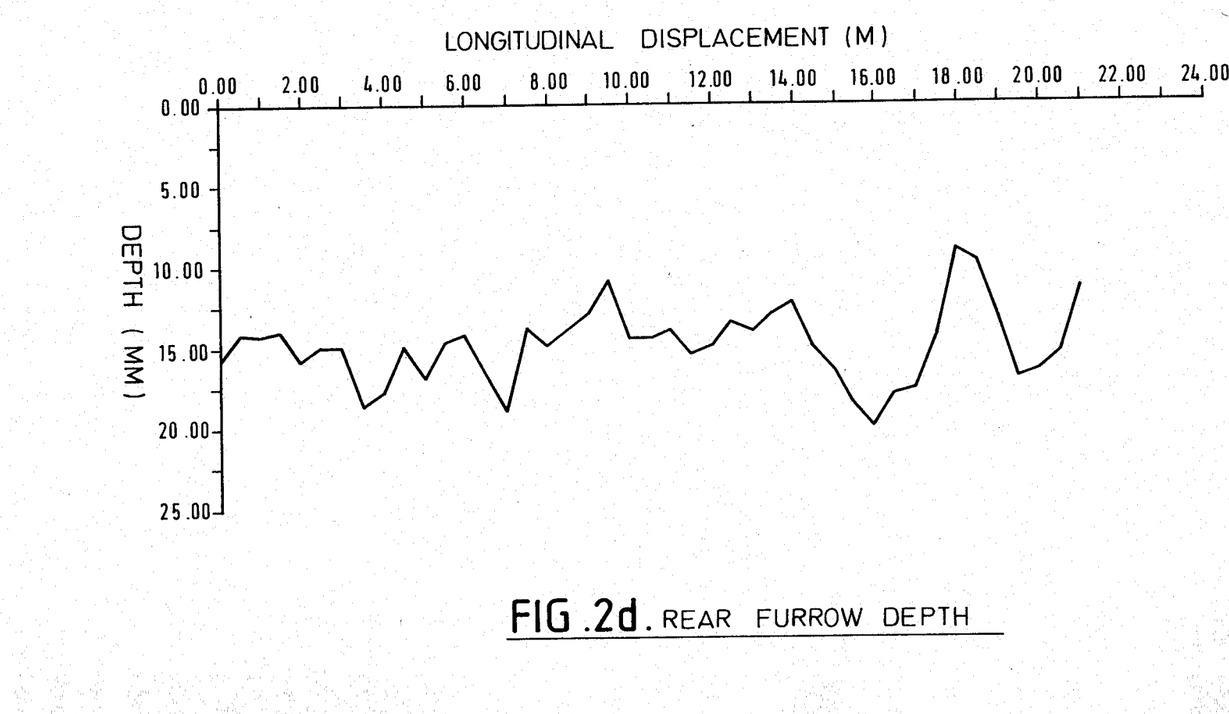

With an arrangement of this nature the traces shown in FIGS. 2c and 2d were obtained. As will be seen, although the ground surface contained a substantial undulation, profile following was close and the furrow obtained was substantially unaffected by the undulation. The test was carried out with a three furrow mouldboard plough operating at 150 mm depth over a standard undulation, that is to say a single sinusoid of 10 m wavelength and 100 mm amplitude. Speeds between 0.8 m/s and 1.4 m/s were employed.

Figure 4A:
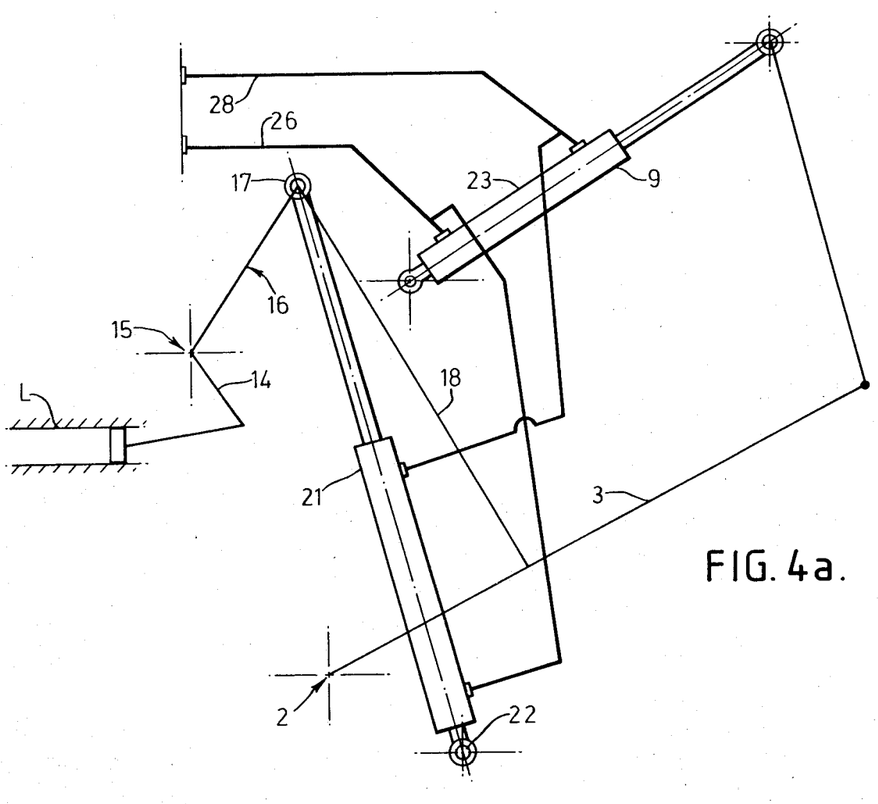
FIGS. 4(a), (b) and 4(c) show diagramatically, but to scale, various components of the linkage of FIG. 3(a), for the purpose of giving exemplary dimensions.

FIGS. 4(a), (b) and 4(c) show the main components of the embodiment of the invention of FIG. 3(a) and illustrate one example of dimensions and angles of inclination of the rams 21 and 23 which may be used.

Figure 4B:
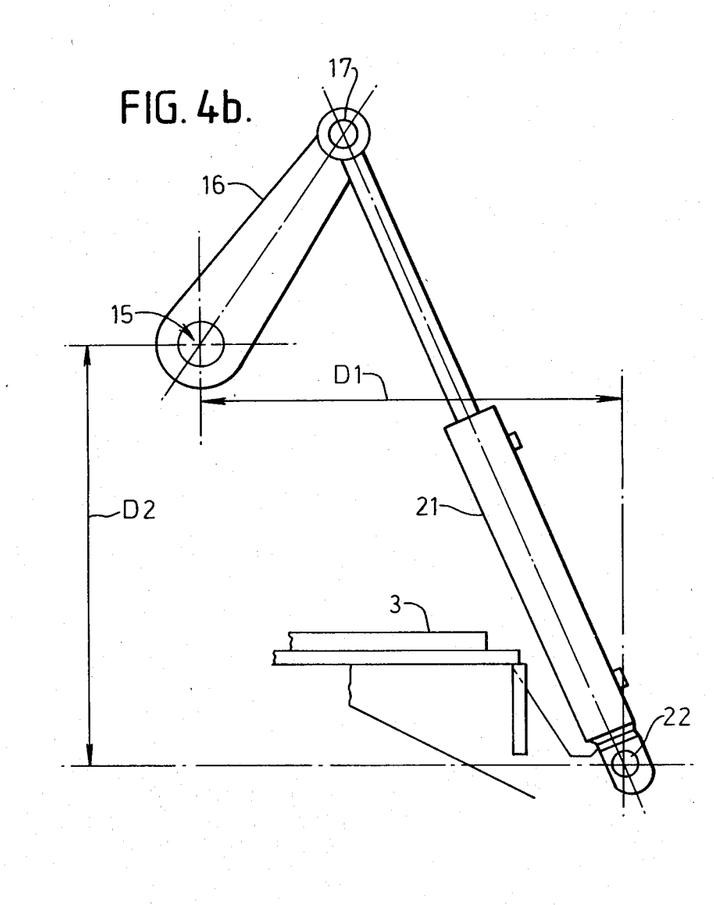
Figure 4C:
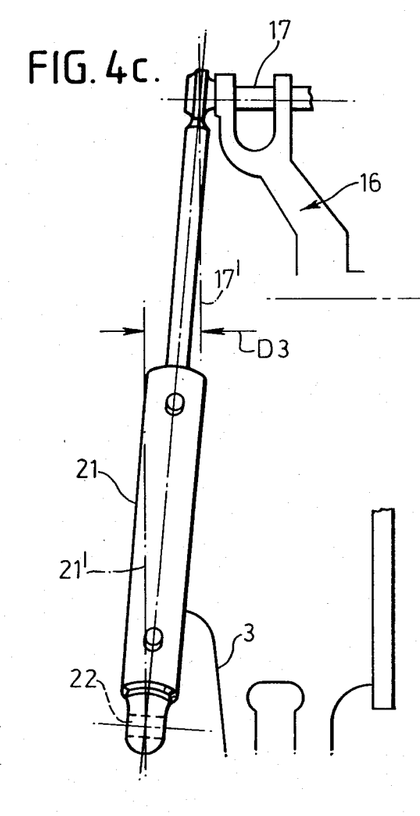
Figure 5A:
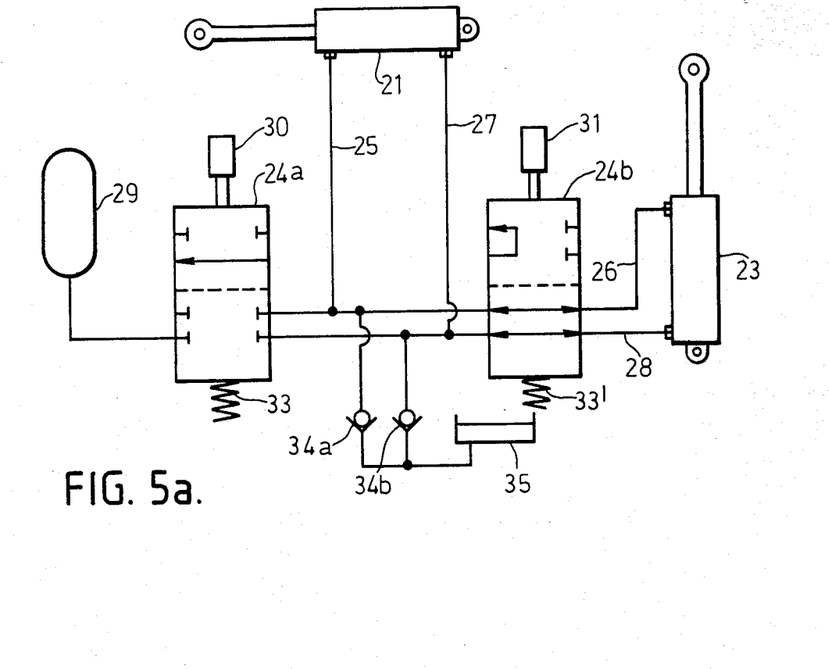
FIGS. 5(a) and 5(b) shows the hydraulic circuitry employed in the arrangement of FIG. 3(b)
Figure 5B:
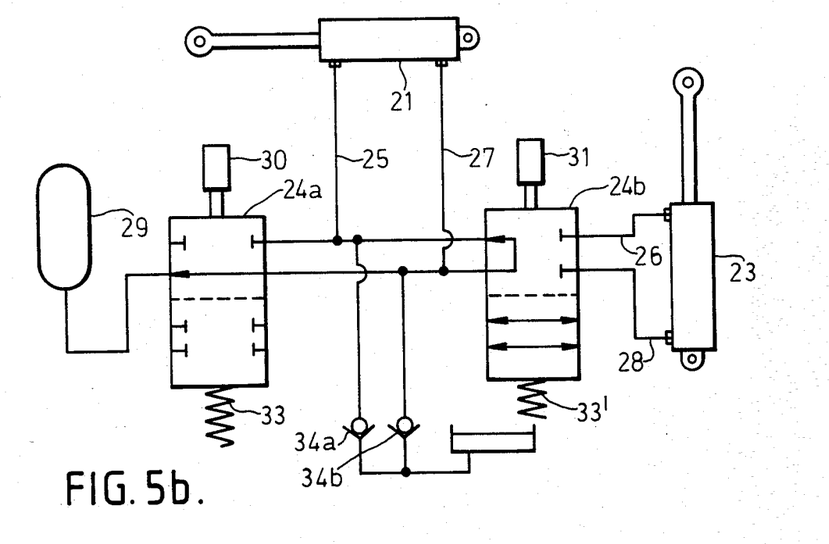

Exemplary dimensions of mounting positions may be as follows:

Horizontal distance D1 between axis of cross shaft 15 and axis of pivot 22: 508.1 mm Vertical distance D2 between axis of cross shaft 15 and axis of pivot 22: 560.4 mm Horizontal distance D3 between a vertical line 17' through centre of coupling between pivot 17 and ram 21, and a vertical line 22' through centre of pivot 22: 57.35 mm Additionally, the following exemplary dimensions of the rams may be used:

Ram 23
  Rod diameter: 30 mm
  Bore diameter: 50 mm
  Collapsed length: 600 mm
  Stroke: 340 mm
Ram 21
  Rod diameter: 30 mm
  Bore diameter: 50 mm
  Collapsed length: 565 mm
  Stroke: 320 mm In the arrangement shown in FIG. 3b an additional valve 24 is provided via which rams 21 and 23 communicate. Additionally the valve 24 is connected to an hydraulic accumulator 29. The hydraulic circuit including the valve 24 is also shown in FIGS. 5a and 5b. The upper diagram FIG. 5a shows the situation when the apparatus is in normal operating mode. In this diagram the two spools of the valve 24 are shown at 24a and 24b and they are operated by cam followers 30 and 31 under the action of a cam 32 (FIG. 3b) which is mounted on the rock shaft 15 and moves with the lift arms 16. Although two cam followers have been shown in FIG. 5a for simplicity of diagrammatic representation, a single spool operated by a single cam follower is the technically preferred arrangement. The spool or spools move under the action of cam 32 against a spring or springs 33. In the configuration shown it will be seen that the two rams 21 and 23 are connected together in the manner above described with reference to FIGS. 3a and 3b. Non return valves 34a and 34b connect lines 25, 26, 27 and 28 to the tractor oil reservoir 35.

When out of use it is normal to elevate the lift assembly to raise the working implement to a transport position well clear of the ground. In order that this should not result in an undesirable large upward tilting of the implement cam 32 is caused automatically to move the spools of valve 24 into the position shown in FIG. 5b when the three point hitch is pivoted above a predetermined position. In this configuration it will be seen that top link ram 23 is isolated from the hydraulic system so that its length remains constant. Ram 21 on the other hand is connected through spool 24a to an accumulator or reservoir 29 and can therefore change its effective length as the implement is raised.

It will be appreciated that the arrangements described above are entirely passive in the sense that once the ram 23 has been set by the hydraulic circuit to a desired initial starting position, the two rams 21 and 23 interact without any requirement for any external input or output pressures to produce the desired result. However, in FIG. 6 an alternative arrangement is shown in which the top link ram 23 is adjusted directly by fluid pressure obtained from the hydraulic power take off from the tractor. The arrangement resembles that of FIG. 3(a) except that the ram 21 is omitted, and a cam 40 replaces the cam 32 of FIG. 3(a). Cam 40 operates on a sensor 41 which supplies a control signal to an electro hydraulic valve 42. Valve 42 controls the flow of hydraulic fluid from a pump 43 to the cavities of ram 23 so as to shorten ram 23 when the lift assembly is raised by lift rods 18 and to lengthen the ram 23 when the assembly is lowered. Thus lengthening and shortening of the top link is carried out in dependence upon the raising and lowering of the three point hitch since cam 40 turns with the cross shaft 15 and lift arms 16. In this embodiment as in the embodiment described with reference to FIGS. 3a and b and 5a and b the initial setting of the top link 9 is made by control of the hydraulic fluid supplied to the two cavities of ram 23 prior to electro hydraulic valve 42 being brought into action.

It will be understood other arrangements than those illustrated in the accompanying drawings are possible within the scope of the invention. For example, in place of the double acting rams shown in the two embodiments described, single acting rams can be used in pairs in opposition to one another. If this is done in an arrangement of the kind described with reference to FIGS. 3a to 5b, the surface areas of the pistons in the various hydraulic rams must be made to conform to the formula quoted above. In this case however the areas $A_1$ and $A_3$, being the front and rear areas of the piston of ram 21 will correspond to the front areas of the two pistons of the two single acting rams. Similarly if ram 23 is replaced by two opposed single acting rams the areas $A_2$ and $A_4$ will be the areas of the front faces of the two respective rams. The flow rates for the hydraulic fluid will also be adjusted accordingly.

Figure 6:
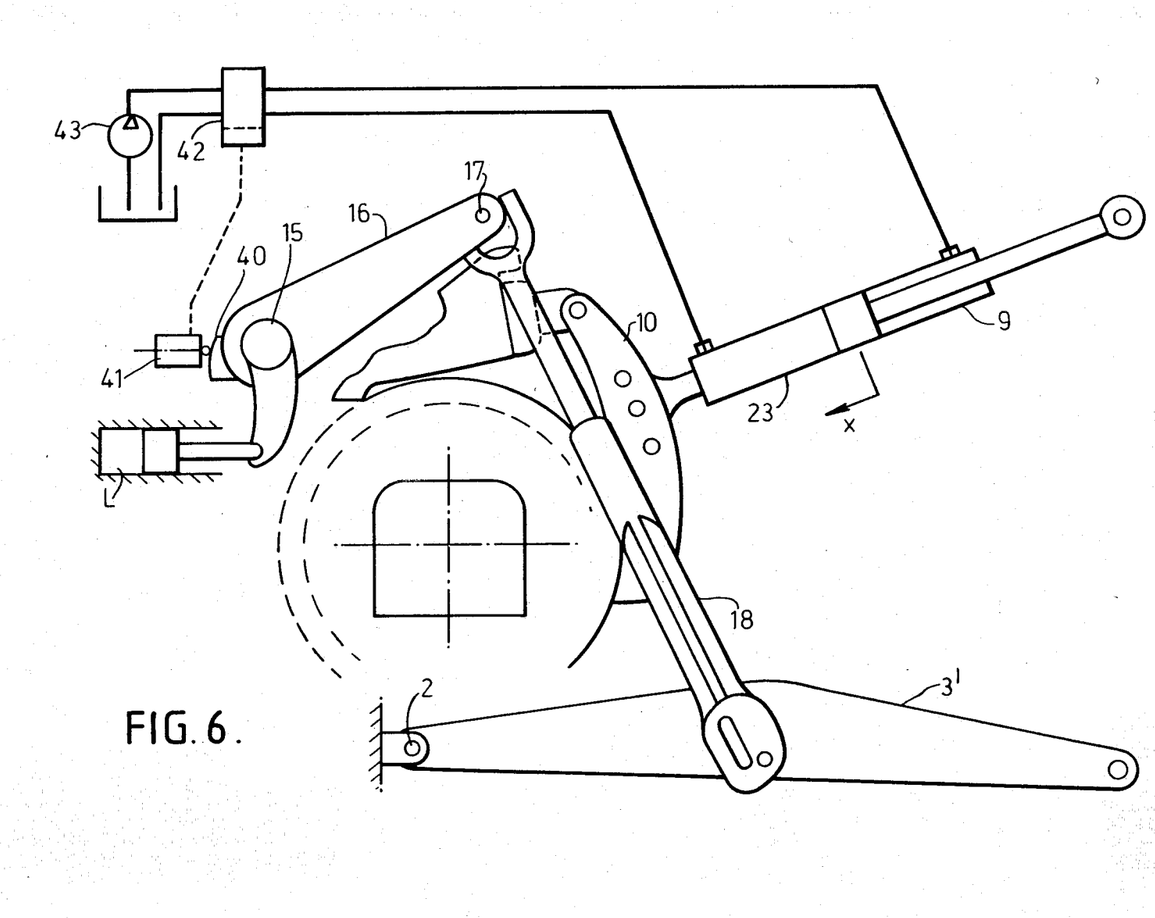
FIG. 6 is a diagrammatic representation of a modified form of a linkage embodying the invention.

In the embodiment shown in FIG. 6 likewise two single acting rams can be used in place of the double acting ram 23 and the piston surface areas will need to be chosen appropriately and the fluid flow rates correspondingly set to achieve the required rates of movement under the control of cam 40.

Other modifications will occur to those skilled in the art. For example the system may operate on a basis of bottom link variability and/or may employ bottom link draft force sensing instead of the top link mechanism described above. Clearly if the mechanism is designed to operate on the bottom link the length variation must be applied to both bottom links and in the sense inverse to that described above as applied to the top link.

Again, although the arrangement described with reference to FIGS. 4 and 5 uses a point of attachment of the ram 21 between the chassis and the lift mechanism such that the point of attachment to the chassis lies below the point of attachment to the lift mechanism, the arrangement could be reversed so that the bottom end of the ram rises and falls with the lift mechanism and its top end is attached to the chassis.

Figure 7:
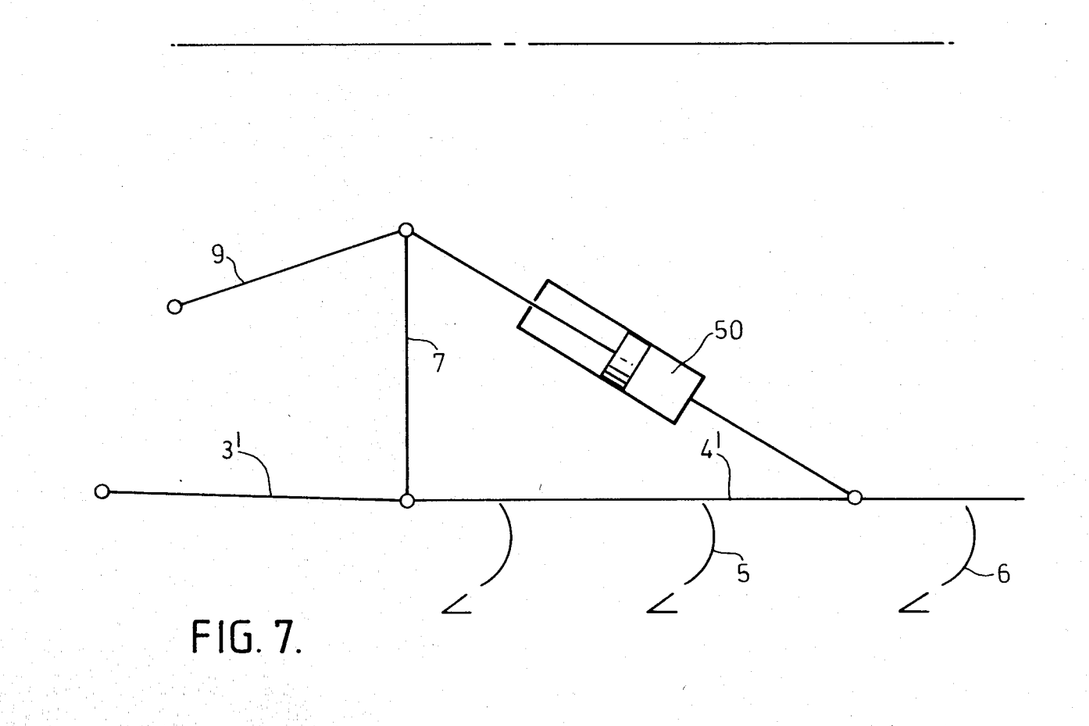
FIG. 7 is a diagrammatic representation of an alternative arrangement for varying the pitch attitude of an implement.

Also, although in the arrangements described above the variation in pitch attitude is achieved by adjusting the length of the top and/or both bottom links of a three point hitch, it is possible to achieve the required variation in pitch attitude of the implement in the manner shown diagrammatically in FIG. 7 by replacing the brace 8 of FIG. 1 by a double-acting ram 50 which can adjust the angle between the implement mast 7 and the mainframe 4'. Thus ram 50 replaces ram 23 of FIG. 3a. Ram 50 is interconnected with ram 21 as described above in relation to FIG. 3a and a fixed length top link 9 is employed.

It will be appreciated that the invention is not necessarily limited to applications where the pivotal framework is raised and lowered in response to changes in the draft force of the implement. For example, the invention also has application to linkages operating in so-called "position control" in which the lift ram is held in a selected position to maintain the implement in a given vertical position relative to the tractor. When operating in position control, the tractor operator by making an adjustment of the vertical position of the implement also automatically adjusts the pitch attitude of the implement. Thus if the operator wished to follow undulations in ground contour when using position control he could achieve this better by adjusting the vertical position of the implement which will result in automatic pitch attitude adjustment.

It will also be understood that the invention has application to linkages operating in so-called "intermix control" in which the vertical position of the pivotal framework is controlled in response to a mixture of "draft force" and framework "position" signals.

Further, the invention is not necessarily limited to applications where the pivotal framework has an active control system.

If the control and sensor ram arrangement of FIG. 3a is applied to a free floating or unrestrained pivotal framework the arrangement is such that, if the implement floats upwards or penetrates more deeply into the soil, the geometry of the pivotal framework will vary.

The force exerted on the control ram 23 by the sum of the forces acting on the implement will be transmitted through the hydraulic hoses 25,27 to act in the sensor ram 21, underneath the lift arms 16 resisting implement penetration.

This force acting under the lift arm will act in the same way as a draft control system, which also exerts a force on the lift arms in response to the top or lower link force. As the implement penetrates deeper into the soil the force on the control ram is increased. This in turn increases the force in the sensor ram, under the lift arms, and the implement rises in the soil to return to the equilibrium depth set by the initial adjustment of the length of ram 23. Similarly, if the implement penetration becomes shallow the control ram force is reduced, the force in the sensor ram is reduced, and the implement penetrates more deeply to return to the equilibrium depth.

When the implement is in work the invention is restraining the implement from penetrating below the equilibrium or target depth. Therefore, the excess force the implement would otherwise use for penetration is transferred through the pivotal framework to the tractor. In this way weight transfer and depth control are achieved by this fully passive arrangement.

Finally it is to be appreciated that the invention is not necessarily limited to application where a soil-engaging implement is towed behind a tractor; the invention may be applied in respect of front or side mounted soil-engaging implements.

We claim:

1. A tractor linkage for coupling a soil-engaging implement to a tractor comprising:
    a three-point hitch comprising top and bottom links for towing said implement behind the tractor;
    an hydraulic lift ram connected to the links for pivotally raising and lowering the hitch relative to the tractor;
    hydraulic control ram means connected to one of said top and bottom links for varying the pitch attitude of said implement relative to said tractor by varying the length of said one link;
    hydraulic sensor ram means connected to said hitch and operable in response to forces exerted between said implement and said tractor to detect changes in the pivot angle of said hitch relative to a reference plane on said tractor to produce a displacement of hydraulic fluid; and
    hydraulic lines connecting said sensor ram means to said control ram means to feed hydraulic fluid displaced from said sensor ram means to said control ram means thereby to produce said variation in the pitch attitude of said implement.

2. A linkage according to claim 1 wherein said control ram means and said sensor ram means each comprise double-acting hydraulic cylinders.

3. A linkage according to claim 2 wherein said control ram means is incorporated in said top link.

4. A linkage according to claim 2 wherein said sensor ram means is connectable between said tractor and said bottom link.

5. A linkage according to claim 1 further comprising adjustment means for adjusting the relative lengths of said control ram means and said sensor ram means to set up an initial pitch attitude of said implement.

6. A linkage according to claim 5 wherein said adjustment means comprises adjustment valve means for controlling the supply of hydraulic fluid to and from said control ram means to adjust the pitch attitude of said implement.

7. A linkage according to claim 1 further comprising isolating valve means for isolating said control ram means from said sensor ram means to allow said hitch to be raised without varying the pitch attitude of said implement.

8. A linkage according to claim 7 further comprising means for automatically operating said isolating valve means when said hitch is raised above a predetermined position relative to said tractor.

* * * * *